(12) United States Patent
Waki

(10) Patent No.: US 7,717,970 B2
(45) Date of Patent: May 18, 2010

(54) FUEL REFORMING DEVICE

(75) Inventor: Norihisa Waki, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 867 days.

(21) Appl. No.: 10/546,862

(22) PCT Filed: Feb. 27, 2004

(86) PCT No.: PCT/JP2004/002454

§ 371 (c)(1),
(2), (4) Date: Aug. 25, 2005

(87) PCT Pub. No.: WO2004/078647

PCT Pub. Date: Sep. 16, 2004

(65) Prior Publication Data

US 2006/0156628 A1    Jul. 20, 2006

(30) Foreign Application Priority Data

Mar. 3, 2003    (JP)    ............... 2003-055651

(51) Int. Cl.
*B01J 8/00*    (2006.01)
*B01J 10/00*    (2006.01)
*B01J 19/00*    (2006.01)
(52) U.S. Cl. ................ 48/127.9; 422/188; 422/198
(58) Field of Classification Search ........... 48/127.9; 422/188, 198
See application file for complete search history.

(56) References Cited

U.S. PATENT DOCUMENTS

| | | |
|---|---|---|
| 5,330,727 A | 7/1994 | Trocciola et al. |
| 6,287,529 B1 | 9/2001 | Heil et al. |
| 6,290,913 B1 | 9/2001 | Aoyama |
| 6,299,853 B1 | 10/2001 | Boneberg et al. |
| 6,495,113 B2 * | 12/2002 | Aoyama ............ 423/247 |
| 7,189,373 B2 * | 3/2007 | Taniguchi et al. ...... 422/129 |

(Continued)

FOREIGN PATENT DOCUMENTS

EP    0 833 401 A2    4/1998

(Continued)

OTHER PUBLICATIONS

Japanese Office Action issued in Japanese Patent Application No. 2003-055651, dated Nov. 18, 2008.

*Primary Examiner*—Walter D Griffin
*Assistant Examiner*—Natasha Young
(74) *Attorney, Agent, or Firm*—McDermott Will & Emery LLP

(57) ABSTRACT

A reformer (8) reforms hydrocarbon fuel and generates reformate gas. A first carbon monoxide oxidizer (1) and second carbon monoxide oxidizer (2) disposed in series decrease the carbon monoxide concentration of the reformate gas by a prefential oxidation. The air for the preferential oxidation is supplied to the carbon monoxide oxidizer (1, 2) from a compressor (9). The reformer (8) consumes the water heated by the reaction heat of the first carbon monoxide oxidizer (1). The water amount supplied for the reformer (8) increases as a fuel reforming requirement of the reformer (8) increases. When the fuel reforming requirement increases, the water heating capability of the first carbon monoxide oxidizer (1) is enhanced with a sufficient response by increasing the proportion of air supplied to the first carbon monoxide oxidizer (1).

6 Claims, 5 Drawing Sheets

U.S. PATENT DOCUMENTS

| | | |
|---|---|---|
| 2001/0005498 A1 | 6/2001 | Benz et al. |
| 2002/0000067 A1* | 1/2002 | Numata et al. ............... 48/61 |
| 2003/0007903 A1 | 1/2003 | Saling et al. |
| 2003/0012990 A1* | 1/2003 | Yamanashi ............... 429/24 |

FOREIGN PATENT DOCUMENTS

| | | |
|---|---|---|
| EP | 995717 A1 * | 4/2000 |
| EP | 1 002 762 A2 | 5/2000 |
| JP | 10-101302 | 4/1998 |
| JP | 2001-143731 | 5/2001 |

\* cited by examiner

FUEL REFORMING DEVICE

RELATED APPLICATION

This application is the U.S. National Phase under 35 U.S.C. §371 of International Application No. PCT/JP2004/002454, filed Feb. 27, 2004, which in turn claims the benefit of Japanese Application No. 2003-055651, filed Mar. 3, 2003, the disclosures of which Applications are incorporated by reference herein in their entirety.

FIELD OF THE INVENTION

This invention relates to heat supply in a reformer which generates reformate gas having hydrogen as its principal component from hydrocarbon fuel.

BACKGROUND OF THE INVENTION

In a reforming device which extracts hydrogen used by a fuel cell stack from a hydrocarbon fuel such as gasoline and methanol, it is necessary to heat a material required for reforming before reforming is performed.

JP2001-143731A published by the Japan Patent Office in 2001 discloses a fuel cell which performs catalytic combustion of anode effluent of the fuel cell in order to heat the hydrocarbon fuel with heat of combustion.

SUMMARY OF THE INVENTION

If the power generation load of the fuel cell stack increases, the hydrogen supplied to the fuel cell stack must be increased. For this purpose, it is necessary to increase the amount of reaction material including the hydrocarbon fuel supplied to the reforming device, and the heat amount required for heating the hydrocarbon fuel also increases. On the other hand, the anode effluent flow rate increases only when the power generation amount of the fuel cell stack increases. In other words, even if the heat amount required by the reforming device increases due to the increase in the reformate gas requirement, the anode effluent flow rate does not immediately increase.

Due to this reason, although the reforming device of the prior art functions well during steady state operation of the fuel cell system, during transient operation when there is a sharp increase of power generation load, the reformate gas supply amount cannot be made to follow the power generation load fluctuation with a sufficient response.

It is therefore an object of this invention to enhance the response of the reformate gas supply to the variation of a reformate gas requirement of the fuel cell stack.

In order to achieve the above object, this invention provides a fuel reforming device which generates hydrogen-rich gas from hydrocarbon fuel. The fuel reforming device comprises a reformer which generates reformate gas having hydrogen as a main component according to a catalytic reaction of plural materials including a hydrocarbon fuel, a first carbon monoxide oxidizer which decreases a carbon monoxide concentration of the reformate gas by oxidizing carbon monoxide in the reformate gas by a preferential oxidation using oxygen, a heating mechanism which heats any of the plural materials using a preferential oxidation heat of the first carbon monoxide oxidizer, a second carbon monoxide oxidizer which decreases a carbon monoxide concentration of the reformate gas by oxidizing the carbon monoxide in the reformate gas by a preferential oxidation using oxygen, an oxygen supply mechanism which supplies oxygen to the first carbon monoxide oxidizer and the second carbon monoxide oxidizer, and an adjusting mechanism which varies an oxygen supply amount to the first carbon monoxide oxidizer and an oxygen supply amount to the second carbon monoxide oxidizer. The second carbon monoxide oxidizer is disposed in series with the first carbon monoxide oxidizer.

The details as well as other features and advantages of this invention are set forth in the remainder of the specification and are shown in the accompanying drawings.

DESCRIPTION OF THE PREFERRED EMBODIMENTS

Figure 1:
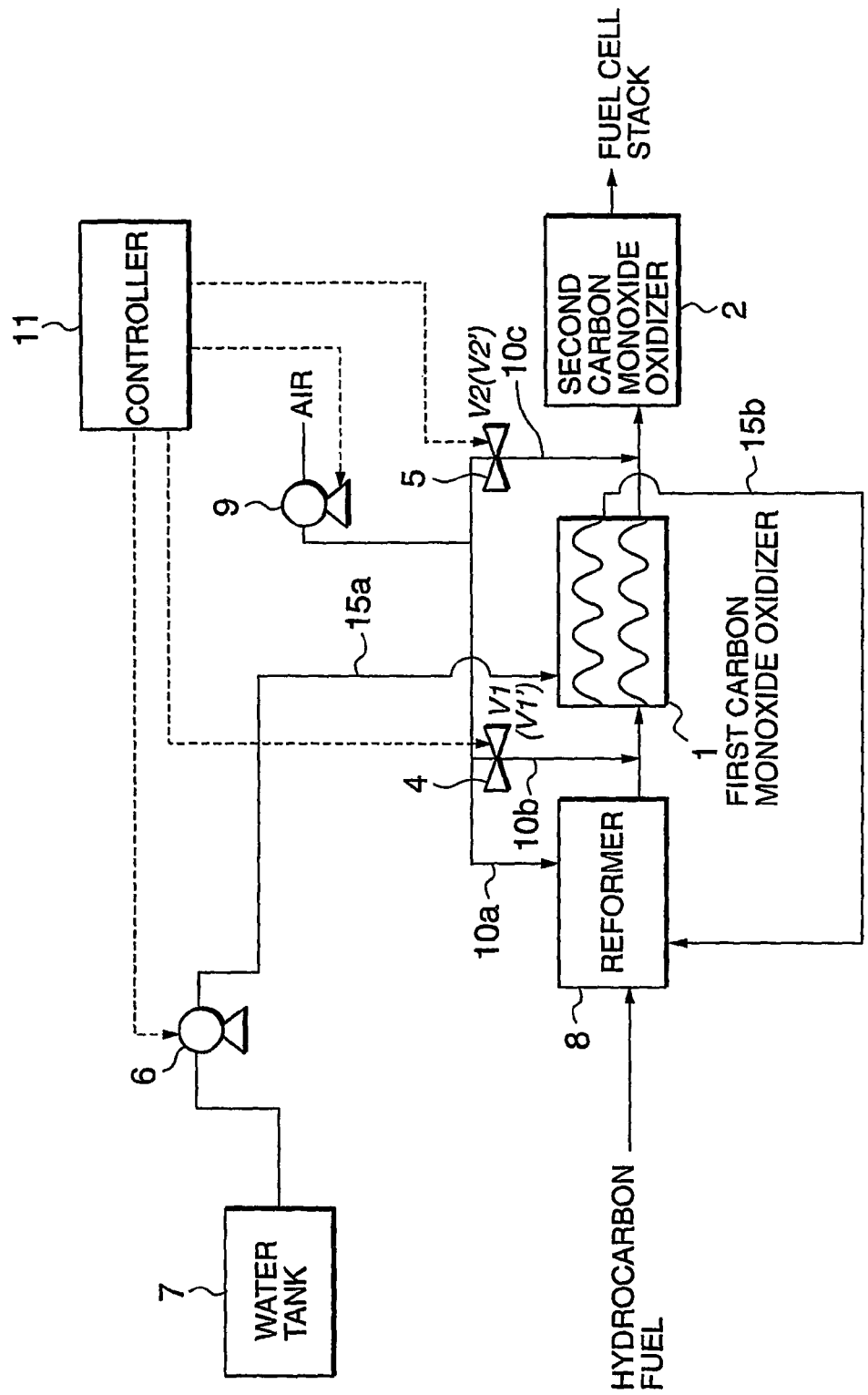
FIG. 1 is a schematic diagram of a fuel reforming device according to this invention.

Referring to FIG. 1 of the drawings, a reforming device according to this invention reforms gasoline which is a hydrocarbon fuel, generates reformate gas having hydrogen as its principal component, and supplies hydrogen-rich gas wherein carbon monoxide has been removed from the reformate gas, to a fuel cell stack.

The reforming device is provided with a reformer 8, a first carbon monoxide oxidizer 1 which removes carbon monoxide from the reformate gas generated by the reformer 8, and a second carbon monoxide oxidizer 2 which removes carbon monoxide from the reformate gas which flows out of the first carbon monoxide oxidizer 1, and supplies the remaining gas to a fuel cell stack.

The reformer 8 is an autothermal reforming device which separates hydrogen from fuel gas by simultaneously performing partial oxidation reforming wherein fuel vapor and air are made to react in the presence of a catalyst, and steam reforming wherein fuel vapor and steam are made to react in the presence of a catalyst.

The first carbon monoxide oxidizer 1 comprises a so-called PROX reactor. The PROX reactor is a reactor which performs a preferential oxidation wherein carbon monoxide in the reformate gas is made to react with the oxygen in the air in the presence of a catalyst, converting it into carbon dioxide ($CO_2$). The second carbon monoxide oxidizer 2 also comprises a PROX reactor which performs the same preferential oxidation. The reformate gas from which carbon monoxide has been removed in the carbon monoxide oxidizers 1 and 2, is supplied to the fuel cell stack as hydrogen-rich gas.

The first carbon monoxide oxidizer 1 and the second carbon monoxide oxidizer 2 are provided separately for the following reason. If a large amount of air is supplied to a large oxidizer, the oxygen concentration changes considerably in the upstream and downstream parts of the oxidizer, and it becomes impossible to perform an efficient preferential oxidation. By providing plural small oxidizers, and supplying air to them separately, an increased efficiency of preferential oxidation is attained. It is also possible to use different catalysts in the first carbon monoxide oxidizer 1 and the second carbon monoxide oxidizer 2.

Air is supplied respectively to the reformer 8, first carbon monoxide oxidizer 1 and second carbon monoxide oxidizer 2 via pipes 10a, 10b, 10c, respectively from an air compressor 9. A valve 4 is installed in the pipe 10b which supplies air to the first carbon monoxide oxidizer 1, and a valve 5 is installed in the pipe 10c which supplies air to the second carbon monoxide oxidizer 2, respectively. The valves 4 and 5 are both valves whereof the opening degree can be adjusted.

In addition to gasoline as hydrocarbon fuel and air, heated water is supplied to the reformer 8.

The reformer 8 comprises a fuel vaporizer, not shown, for vaporizing gasoline beforehand. Water is atomized by hot fuel vapor generated by the fuel vaporizer, and a gaseous mixture of fuel vapor, steam and air is generated in the reforming device 8 by supplying air. The reformer 8 initiates a steam-reforming reaction and a partial oxidation reforming reaction in this gaseous mixture in the presence of the reforming catalyst, and generates reformate gas having hydrogen as its principal component.

In order to generate a gaseous mixture suitable for reforming, the water sprayed into the reformer 8 is first heated by the construction described below.

Specifically, water in a water tank 7 is first supplied to a heat exchanger with which the first carbon monoxide oxidizer 1 is provided via a pipe 15a by a pump 6. The heat exchanger heats the water using the heat of the preferential oxidation of the first carbon monoxide oxidizer 1. High temperature water which passed through the heat exchanger is supplied to the reformer 8 via a pipe 15b. On the other hand, reformate gas from which carbon monoxide has been removed in the first carbon monoxide oxidizer 1, after being cooled by heat exchange with water, is supplied to the second carbon monoxide oxidizer 2.

When the power generation load of the fuel cell stack increases, it is necessary to increase the fuel supply amount, the air supply amount and the high temperature water supply amount to the reformer 8. As for the high temperature water supply amount, it is necessary to increase not only the water discharge amount of the pump 6, but also the heat generation amount of the first carbon monoxide oxidizer 1 which performs heat exchange with the water discharged by the pump 6.

Figure 2:
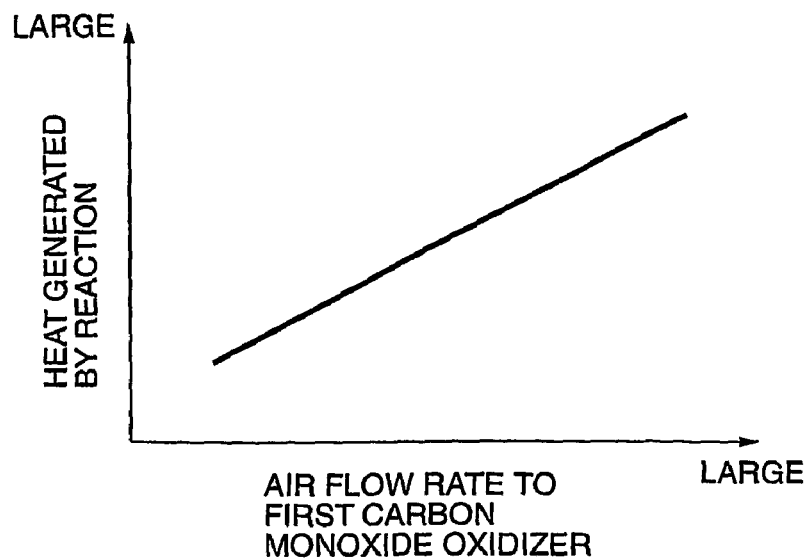
FIG. 2 is a diagram describing the relation between a supply air flow rate and heat generation amount in a first carbon monoxide oxidizer according to this invention.

Referring to FIG. 2, in the PROX reactor forming the first carbon monoxide oxidizer 1, the heat generation amount of the catalyst due to preferential oxidation increases, as the air supply amount increases.

However, the air supply amount to the PROX reactor has a fixed limit. If the temperature of PROX reactor rises too much, a so-called reverse water gas shift reaction, in which carbon dioxide reacts with hydrogen to generate carbon monoxide and water, will occur. The reverse water gas shift reaction is a reaction which is contrary to the purpose of removing carbon monoxide from reformate gas and raising the hydrogen concentration. Therefore, the air supply to the PROX reactor must be performed within limits such that the reverse water gas shift reaction does not occur. A typical maximum temperature of the first carbon monoxide oxidizer 1 at which a reverse water gas shift reaction does not occur, is 200 degrees Centigrade.

In this embodiment, the total air amount of the air amount supplied to the first carbon monoxide oxidizer 1 and the air amount supplied to the second carbon monoxide oxidizer 2 is firstly maintained at an amount suitable for partial oxidation of the carbon monoxide contained in the reformate gas. In order to satisfy this condition, the total flow rate of the valves 4 and 5 is arranged to be directly proportional to the fuel supply flow rate to the reformer 8.

On the other hand, in order to make the catalytic reaction heat of the first carbon monoxide oxidizer 1 increase correspondingly to the increase in the fuel reforming requirement of the reformer 8, it is necessary to increase the air supply amount to the first carbon monoxide oxidizer 1.

For this purpose, according to this invention, the flow rate ratio of the valves 4 and 5, i.e. the ratio of the flowrate of the valve 4 with respect to the flowrate of the valve 5, is increased while making the total flow rate of valves 4 and 5 directly proportional to the fuel supply flow rate to the reformer 8. In other words, the air flow rate of the valve 4 is made to increase relatively to the air flow rate of the valve 5.

However, as a result of this processing, it is necessary to suppress the flow rate ratio of the valves 4 and 5 to below a predetermined upper limiting value so that the temperature of the first carbon monoxide oxidizer 1 does not rise too much. The upper limiting value varies according to the capacity and specifications of the first carbon monoxide oxidizer 1 and the second carbon monoxide oxidizer 2, so the upper limiting value is set experimentally beforehand.

The operation of the pump 6 and the air compressor 9 relevant to the above control and the opening degree of the valves 4 and 5, are respectively controlled by signals from a controller 11.

The controller 11 comprises a microcomputer provided with a central processing unit (CPU), read-only memory (ROM), random access memory (RAM) and input/output interface (I/O interface). The controller 11 may also comprise plural microcomputers.

The controller 11 increases the fuel amount supplied to the reformer 8 according to an increase in the fuel reforming requirement of the reformer 8, i.e., the increase in reformate gas which the fuel cell stack requires. Moreover, the air discharge flow rate of the air compressor 9 is made to increase in proportion to the fuel amount supplied to the reformer 8.

As the controller 11 increases the high temperature water supply amount to the reformer 8, it increases the water discharge amount of the pump 6. As a result, the flow rate of water subjected to heat exchange in the first carbon monoxide oxidizer 1 increases, and the required amount of heat exchange between water and reformate gas also increases.

Correspondingly, the controller 11 varies the opening degree of the valves 4 and 5 so that it is within a range which does not impair the preferential oxidation of the carbon monoxide in the first carbon monoxide oxidizer 1. As a result, the air flow rate supplied to the first carbon monoxide oxidizer 1 increases relatively to the air flow rate supplied to the second carbon monoxide oxidizer 2.

Next, referring to FIG. 3, the air flow rate ratio control routine of the valves 4 and 5 performed by the controller 11 will be described.

This routine is performed at an interval of ten milliseconds during operation of the reforming device.

The controller 11, firstly in a step S30 1, determines whether or not there was a change in the fuel reforming requirement of the reformer 8. The power generation of the fuel cell stack is controlled by the controller 11, or is controlled by another controller comprising a microprocessor similar to that of the controller 11. As the fuel reforming requirement of the reformer 8 corresponds to the power generation load of the fuel cell stack, as for the controller 11, the fuel reforming requirement of the reformer 8 is a known value, or is a value which can be acquired from another controller via a signal circuit. The controller 11 performs this determination by determining whether or not the difference of the value $SV_n$ of the fuel reforming requirement obtained on the present occasion the routine is executed and the value $SV_{n-1}$ of the fuel reforming requirement obtained on the immediately preceding occasion the routine was executed, is less than a predetermined value.

When there is no large variation in the fuel reforming requirement, i.e., when the difference between $SV_n$, and $SV_{n-1}$ is less than the predetermined value, the controller 11 selects a combination of the opening degree of the valves 4 and 5 which realizes a flow rate ratio V1/(V1+V2) for steady running in a step S304. After setting the opening degree of the valves 4 and 5 to the selected combination, the controller 11 terminates the routine.

On the other hand, when the difference in the fuel reforming requirement exceeds the predetermined value in the step S301, in a step S302, the controller determines whether or not the value $SV_n$ of the fuel reforming requirement has increased from the immediately preceding value $SV_{n-1}$. When the value $SV_n$ of the fuel reforming requirement has increased, the controller 11 performs the processing of a step S303. When the value $SV_n$ of the fuel reforming requirement has not increased, after performing the same processing as for steady running in the step S304, the controller 11 terminates the routine.

In the step S303, the controller 11 selects a combination of the opening degree of the valves 4 and 5 which realizes a flow rate ratio V1'/(V1'+V2') for increased fuel reforming requirement, and adjusts the opening degree of the valves 4 and 5 to the selected combination. After adjusting the opening degree of the valves 4 and 5, the controller 11 terminates the routine. The valves 4 and 5 are not necessarily operated simultaneously. For example, the opening degree of the valve 4 may be increased first, and the opening degree of the valve 5 may be increased after a predetermined time.

Herein, the flow rate ratio V1/(V1+V2) for steady running and the flow rate ratio V1'/(V1'+V2') for increased fuel reforming requirement, will be described. V1, V1' express the air flow rate of the valve 4, and V2, V2' express the air flow rate of the valve 5.

When the opening degree of the valves 4 and 5 is fixed, even if the discharge air flow rate of the air compressor 9 is changed, the discharged air is always distributed to the reformer 8, the first carbon monoxide oxidizer 1 and the second carbon monoxide oxidizer 2 in a fixed proportion. The flow rate ratio V1/(V1+V2) for steady running applied in the step S304, and the flow rate ratio V1'/(V1'+V2') for increased fuel reforming requirement applied in the step S303, are fixed values preset by experiment. The flow rate ratio V1'/(V1'+V2') for increased fuel reforming requirement is set to be higher than the flow rate ratio V1/(V1+V2) for steady running, but it should not exceed the aforesaid upper limiting value. The memory (ROM) of the controller 3 first stores these combinations of the opening degree of the valves 4 and 5 corresponding to these flow rate ratios.

Figure 4A:
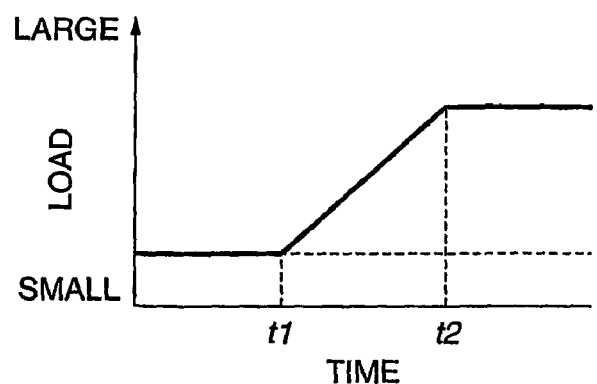
FIGS. 4A and 4B are timing charts describing the variations in power generation load and air flow rate ratio according to the execution of the air flow rate ratio control routine.
Figure 4B:
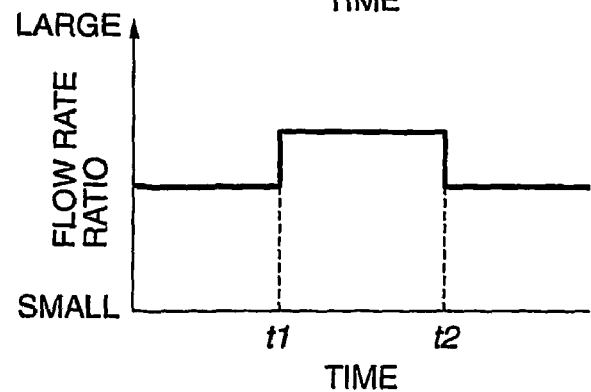

Next, referring to FIGS. 4A and 4B, the result of executing the aforesaid air flow rate ratio control routine by the controller 11 will be described.

During steady running, the valves 4 and 5 are held at an opening degree corresponding to the flow rate ratio V1/(V1+V2) for steady running. In this state, the first carbon monoxide oxidizer 1 and the second carbon monoxide oxidizer 2 reduce the carbon monoxide concentration to a desirable state by performing the preferential oxidation action on the reformate gas generated by the reformer 8.

On the other hand, in the first carbon monoxide oxidizer 1, heat exchange is performed between the water supplied from the pump 6 and the heat generated by the preferential oxidation of carbon monoxide in the first carbon monoxide oxidizer 1, and heated water is supplied to the reformer 8.

From the time t1 to t2, the fuel reforming requirement of the reformer 8 increases, and if the value $SV_n$ of the fuel reforming requirement exceeds the immediately preceding value $SV_{n-1}$ by more than the predetermined value in the steps S301 and S302, the controller 11 selects the combination of the opening degree of the valves 4 and 5 corresponding to the flow rate ratio V1'/(V1'+V2') for increased fuel reforming requirement in the step S303, and adjusts the opening degree of the valves 4 and 5 accordingly. As a result, the flow rate ratio of the valves 4 and 5 increases from V1/(V1+V2) for steady running to V1'/(V1'+V2') for increased fuel reforming requirement, and the flow rate of the valve 4 increases relatively compared with the flow rate of the valve 5.

As the fuel reforming requirement of the reformer 8 increases, the fuel supply amount, the air supply amount and the high temperature water supply amount to the reformer 8 all increase. Although the pump 6 increases its discharge amount according to the increased demand for high temperature water, as the controller 11 simultaneously increases the air supply flow rate ratio to the first carbon monoxide oxidizer 1 via the valve 4, the first carbon monoxide oxidizer 1 increases the heat of the preferential oxidation. As a result, the high temperature water supply amount to the reformer 8 can also be increased according to the increase in the fuel reforming requirement of the reformer 8, and the reforming device can increase the hydrogen generation amount with a sufficient response to the increase in the power generation load of the fuel cells stack.

By setting the flow rate ratio based on the upper limiting value as mentioned above, the heat generation amount increased by the first carbon monoxide oxidizer 1 is consumed by heat exchange with the increased amount of water, so the temperature of the first carbon monoxide oxidizer 1 does not rise excessively.

If the fuel reforming requirement of the reformer 8 again stabilizes after the time t2, it is determined that the fuel reforming requirement has not changed in the step S301, and the controller 11 changes the opening degree of the valves 4 and 5 to the combination corresponding to the flow rate ratio V1/(V1+V2) for steady running in the step S304.

In this case, although the fuel reforming requirement of the reformer 8 has increased compared with the period before the time t1, the fuel supply amount, the air supply amount of the air compressor 9, the water supply amount of the pump 6 and the heat generation amount of the first carbon monoxide oxidizer 1 have respectively increased according to the increase in the fuel reforming requirement, so reforming and carbon monoxide removal take place in a balanced manner due to steady running at the same flow rate ratio V1/(V1+V2) as before the time t1.

Summarizing the above, this invention heats by using high temperature steam heated by the first carbon monoxide oxidizer 1 instead of heating the fuel supplied to the reformer 8 using the anode effluent of the fuel cell stack. Also, when the heat amount required for heating the fuel increases, by temporarily increasing the air amount supplied to the first carbon monoxide oxidizer 1, the heat of the preferential oxidation of the first carbon monoxide oxidizer 1 is increased, and the amount of high temperature water can be rapidly increased.

Therefore, the high temperature water amount supplied to the reformer 8 can be controlled regardless of the power generation reaction of the fuel cell stack, and the high temperature water amount supplied to the reformer 8 can be varied with a sufficient response to the fuel reforming requirement of the reformer 8.

As the variation of air amount supplied to the first carbon monoxide oxidizer 1 is performed within a range which does not affect the carbon monoxide removal function of the first carbon monoxide oxidizer 1 and the second carbon monoxide oxidizer 2, the components of the hydrogen rich gas supplied to the fuel cell stack from the reforming device are also unaffected.

Figure 5:
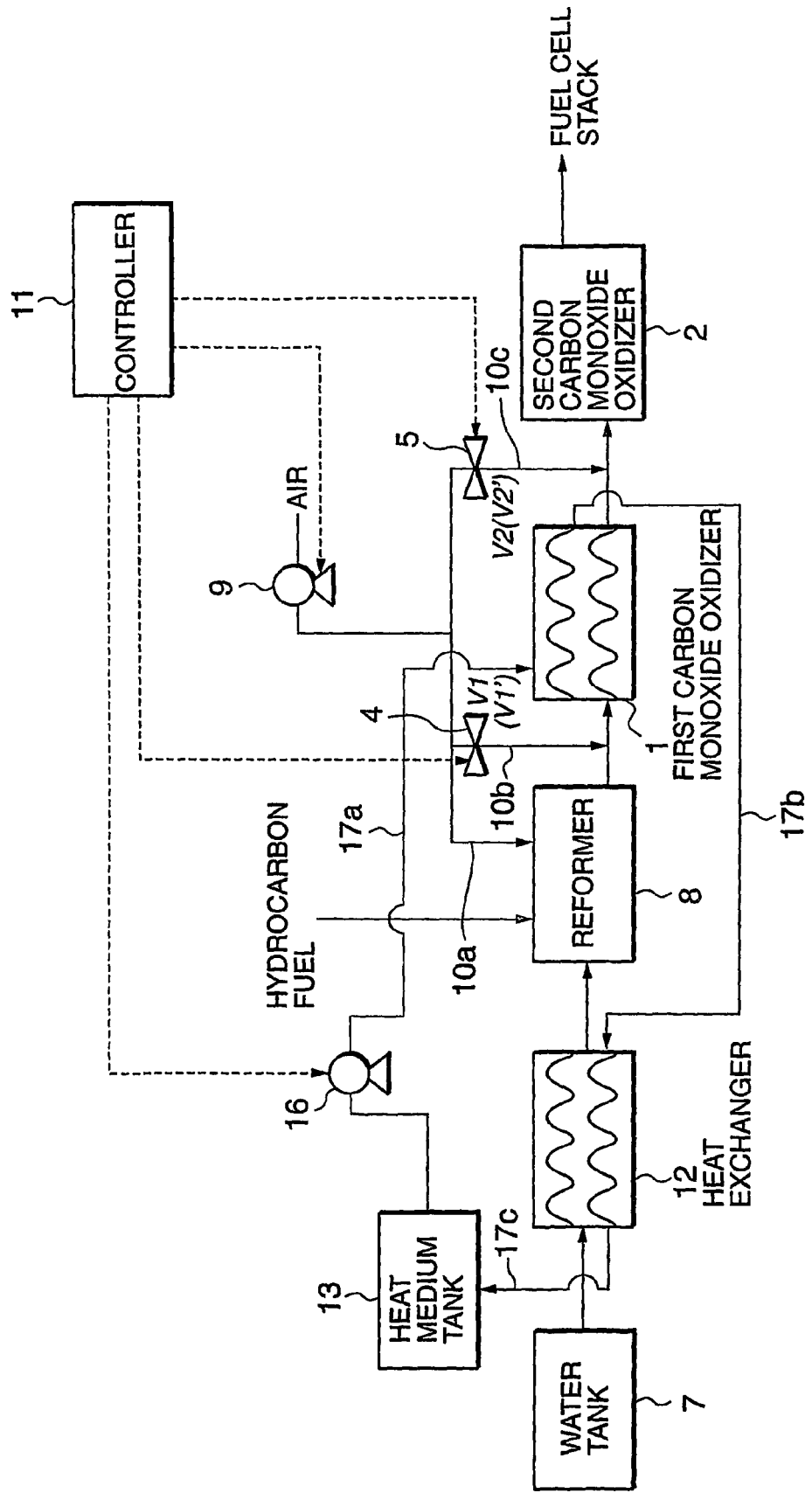
FIG. 5 is similar to FIG. 1, but shows a second embodiment of this invention.

Next, referring to FIG. 5, a second embodiment of this invention will be described.

The reforming device according to this embodiment heats water using a heat medium. The heat medium is supplied to the heat exchanger in the first carbon monoxide oxidizer 1 from a heat medium tank 13 by a pump 16, and is heated by heat exchange with the preferential oxidation heat of the first carbon monoxide oxidizer 1. The hot heat medium is led to a heat exchanger 12.

Water from the water tank 7 is led to the heat exchanger 12. The water is heated by heat exchange between the heat medium and water in the heat exchanger 12, and is supplied as high temperature water to the reformer 8. The heat medium which radiated heat in the heat exchanger 12 is recirculated to the heat medium tank 13.

The remaining construction of the reforming device including the construction of the reformer 8 is identical to that of the first embodiment. Also in this embodiment, the controller 11 controls the opening degree of the valves 4 and 5 by performing the routine of FIG. 3. The controller 11 changes the supply amount of the heat medium by a pump 16 according to the fuel reforming requirement of the reformer 8.

Also in this embodiment, the high temperature water amount supplied to the reformer 8 can be increased with a sufficient response to the increase in the fuel reforming requirement by changing the flow rate ratio of the valves 4 and 5.

In this embodiment, as a heat medium is used, the heat exchange amount in the first carbon monoxide oxidizer 1 can be arbitrarily set by choosing the specific heat of the heat medium. For example, by using a heat medium of low specific heat, the heat exchange amount in the first carbon monoxide oxidizer 1 can be increased, and more heat can be supplied to water in the heat exchanger 12. The cooling efficiency of the reformate gas can also be increased by using a heat medium of low specific heat.

Figure 6:
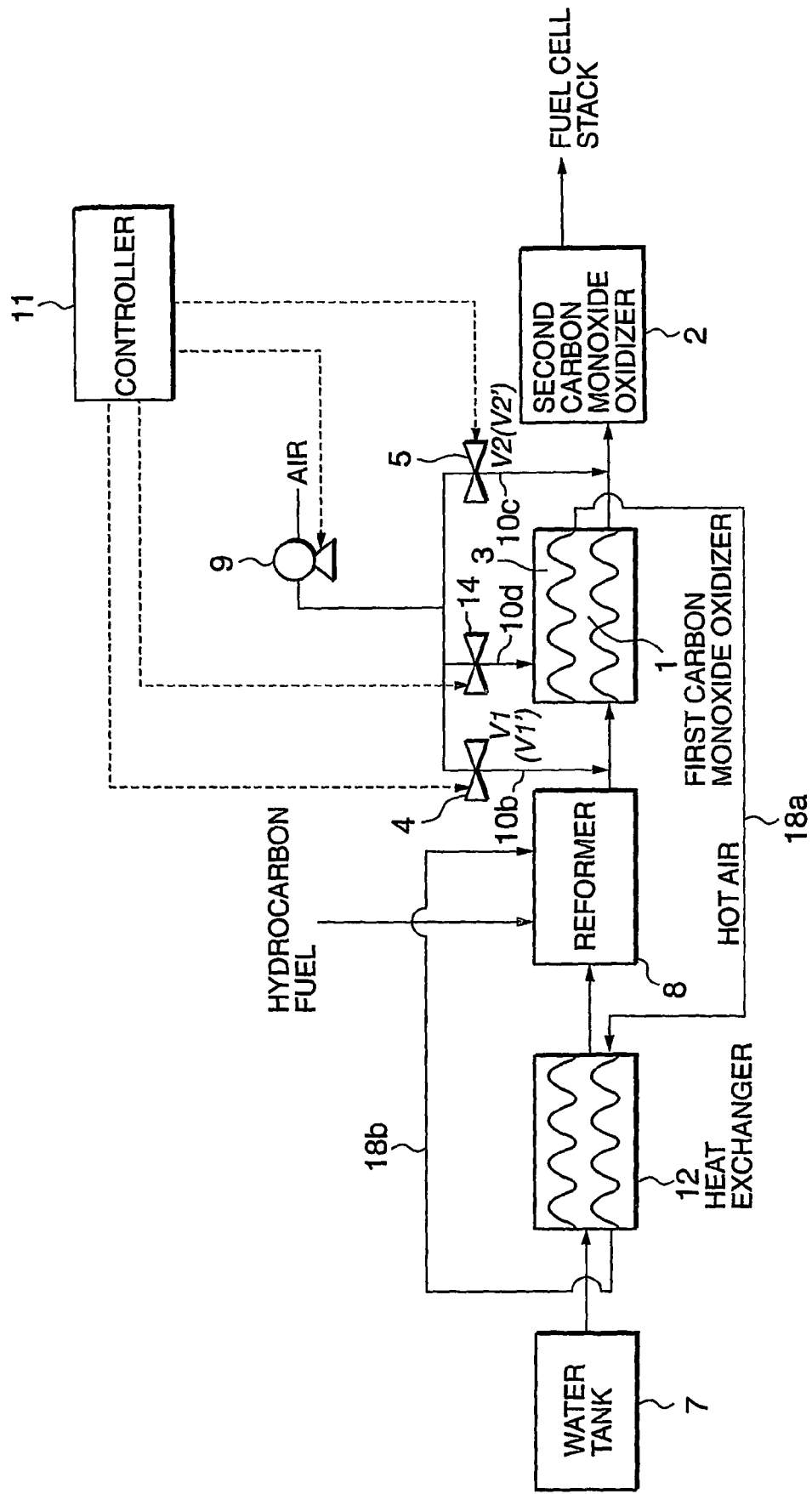
FIG. 6 is similar to FIG. 1, but shows a third embodiment of this invention.

Next, referring to FIG. 6, a third embodiment of this invention will be described.

The reforming device according to this embodiment introduces air into the heat exchanger of the first carbon monoxide oxidizer 1 via a pipe 10d and a valve 14. The heat exchanger performs heat exchange between the preferential oxidation heat of the first carbon monoxide oxidizer 1 and air, and supplies the heated high temperature air to the heat exchanger 12. Water is supplied to the heat exchanger 12 from the water tank 7, and the high temperature water heated by heat exchange with the high temperature air in the heat exchanger 12 is supplied to the reforming device 8.

On the other hand, the air which heated the water in the heat exchanger 12 is also supplied to the reforming device 8. The remaining construction of the reforming device is identical to that of the first embodiment. The opening degree of the valve 14 is assumed to be fixed regardless of the fuel reforming requirement of the reformer 8, and the air flow rate of the valve 14 varies according to the rotation speed of the air compressor 9 corresponding to the fuel reforming requirement of the reformer 8.

Figure 3:
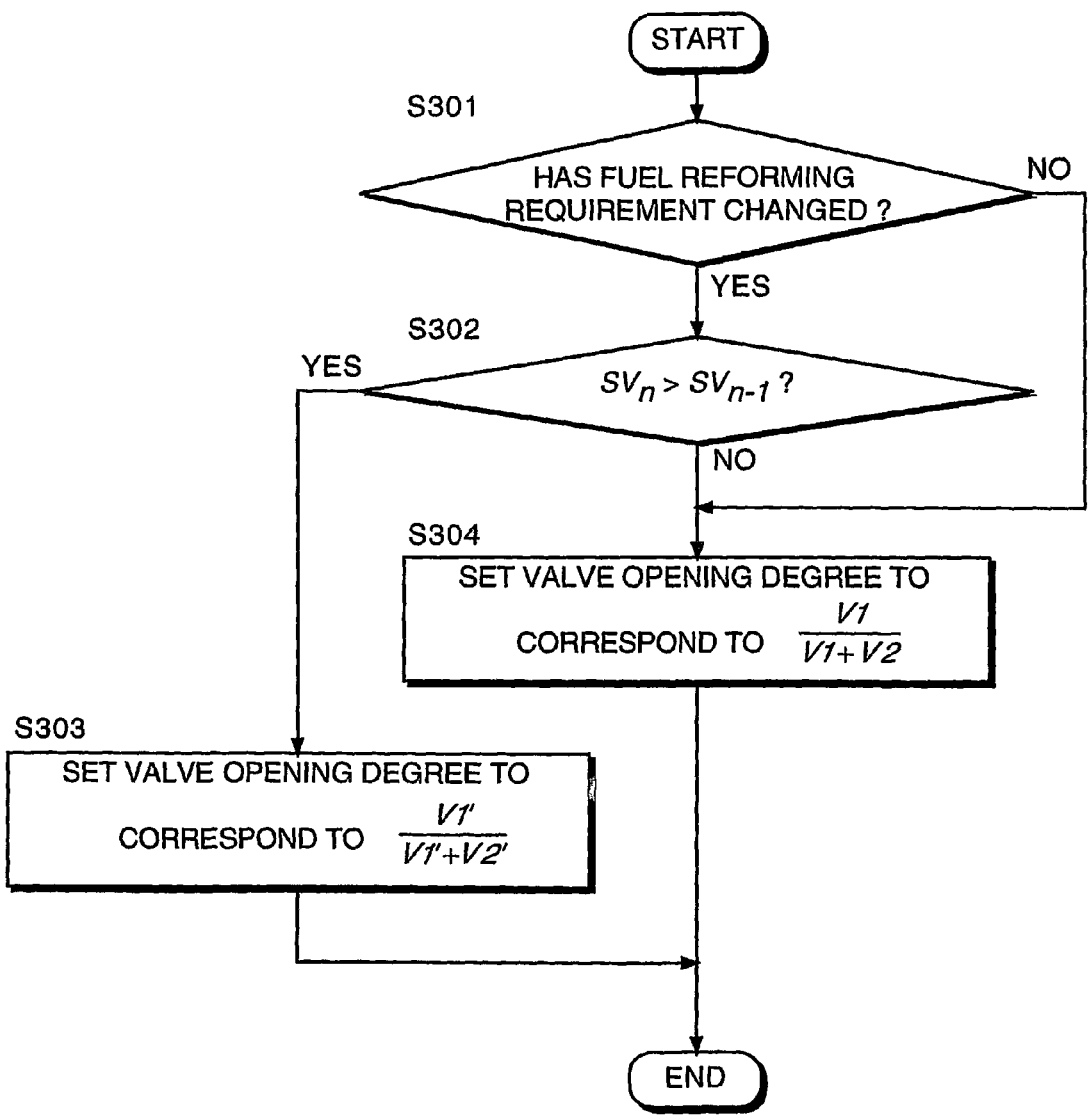
FIG. 3 is a flow chart describing an air flow rate ratio control routine performed by a controller according to this invention.

Also in this embodiment, the controller 11 performs the routine of FIG. 3 and varies the flow rate ratio of valves 4 and 5 according to the fuel reforming requirement of the reformer 8. Therefore, the high temperature water amount supplied to the reformer 8 can be increased with a sufficiently good response according to the increase in the fuel reforming requirement of the reformer 8 regardless of the running state of the fuel cell stack.

According to this embodiment, heat exchange between water and air is performed by the heat exchanger 12, but as this heat is completely consumed by fuel reforming in the reformer 8, no heat is wasted and reforming efficiency is also high.

The contents of Tokugan 2003-055651, with a filing date of Mar. 3, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in all of the above embodiments, although the first carbon monoxide oxidizer 1 which performs heat exchange is disposed upstream of the second carbon monoxide oxidizer 2, it is also possible to dispose the second carbon monoxide oxidizer 2 upstream of the first carbon monoxide oxidizer 1. Moreover, it is also possible to provide another carbon monoxide oxidizer in addition to the first carbon monoxide oxidizer 1 and second carbon monoxide oxidizer 2.

In the above embodiments, although the preferential oxidation heat of the first carbon monoxide oxidizer 1 is used for heating water, the substance heated by the preferential oxidation heat of the first carbon monoxide oxidizer 1 is not limited to water. A desirable effect is obtained even if it is applied to the heating of another material consumed by the reformer 8, i.e., hydrocarbon fuel or air.

INDUSTRIAL FIELD OF APPLICATION

As described above, according to this invention, heating of the material supplied to the reformer 8 can be enhanced with a sufficient response to the increase in the fuel reforming requirement of the reformer, regardless of the running state of the fuel cell stack, by increasing the air supply proportion to the first carbon monoxide oxidizer 1. Therefore, this invention has a desirable effect particularly in application to a fuel cell vehicle wherein the fuel reforming requirement changes frequently.

The embodiments of this invention in which an exclusive property or privilege is claimed are defined as follows:

The invention claimed is:

1. A fuel reforming device which generates hydrogen-rich gas from hydrocarbon fuel, comprising:
    a reformer which generates reformate gas having hydrogen as a main component according to a catalytic reaction of plural materials including a hydrocarbon fuel;
    a first carbon monoxide oxidizer which decreases a carbon monoxide concentration of the reformate gas by oxidizing carbon monoxide in the reformate gas by a preferential oxidation using oxygen;
    a heating mechanism which heats any of the plural materials using a preferential oxidation heat of the first carbon monoxide oxidizer;
    a second carbon monoxide oxidizer which decreases a carbon monoxide concentration of the reformate gas by oxidizing the carbon monoxide in the reformate gas by a preferential oxidation using oxygen, the second carbon monoxide oxidizer being disposed in series with the first carbon monoxide oxidizer;

an oxygen supply mechanism which supplies oxygen to the first carbon monoxide oxidizer and the second carbon monoxide oxidizer;

an adjusting mechanism which varies an oxygen supply amount to the first carbon monoxide oxidizer and an oxygen supply amount to the second carbon monoxide oxidizer; and a programmable controller programmed to:

control the adjusting mechanism to increase a total oxygen supply amount to the first carbon monoxide oxidizer and the second carbon monoxide oxidizer by the oxygen supply mechanism as a fuel reforming requirement of the reformer increases; and control the adjusting mechanism to increase the oxygen supply amount to the first carbon monoxide oxidizer relative to the oxygen supply amount to the second carbon monoxide oxidizer, when the fuel reforming requirement is increasing.

2. The fuel reforming device as defined in claim 1, wherein the first carbon monoxide oxidizer is disposed upstream of the second carbon monoxide oxidizer with respect to a flow direction of the reformate gas.

3. The fuel reforming device as defined in claim 1, wherein the reformer is configured to reform hydrocarbon fuel using water, and the heating mechanism comprises a mechanism which supplies water heated by the preferential oxidation heat of the first carbon monoxide oxidizer to the reformer.

4. The fuel reforming device as defined in claim 3, wherein the heated water supplying mechanism comprises a heat exchange mechanism which heats a heat medium by the preferential oxidation heat of the first carbon monoxide oxidizer, causes the heated heat medium to exchange heat with water, and supplies the water to the reformer.

5. The fuel reforming device as defined in claim 4, wherein the oxygen supply mechanism comprises an air supply mechanism which supplies air, and the heat medium comprises part of the air supplied by the air supply mechanism.

6. The fuel reforming device as defined in claim 5, wherein the reformer is further configured to reform hydrocarbon fuel using oxygen, and the heat exchange mechanism is configured to supply air to the reformer after exchanging heat with water.

* * * * *